A. CLARK.
Telescope.
No. 8,509.
Patented Nov. 11, 1851.
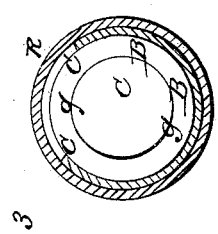
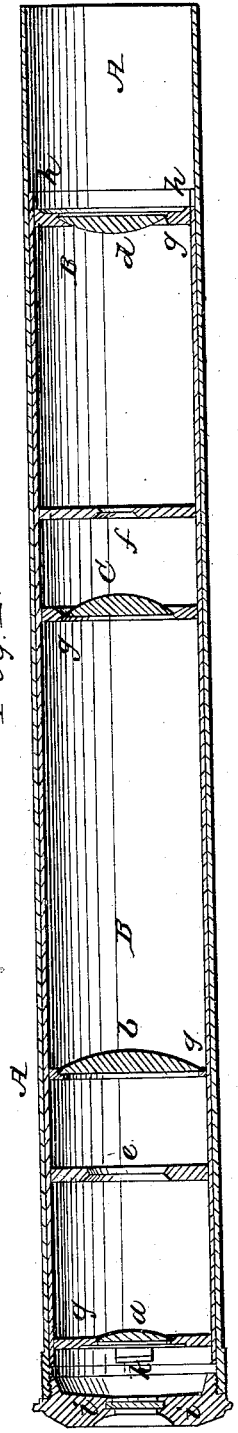
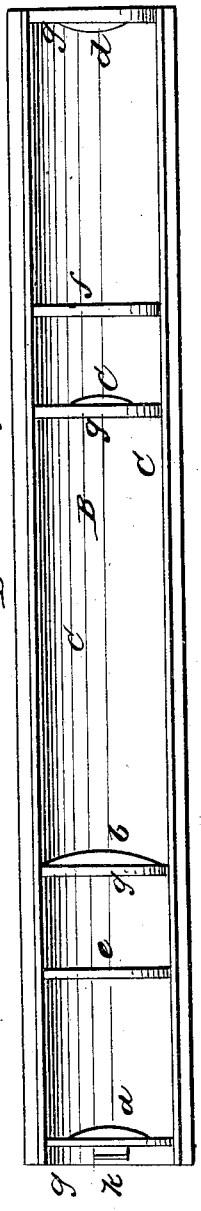

UNITED STATES PATENT OFFICE.

ALVAN CLARK, OF CAMBRIDGE, MASSACHUSETTS.

IMPROVEMENT IN TELESCOPES.

Specification forming part of Letters Patent No. 8,509, dated November 11, 1851.

*To all whom it may concern:*

Be it known that I, ALVAN CLARK, of Cambridge, in the county of Middlesex and State of Massachusetts, have invented a new and useful Improvement in Telescopes; and I do hereby declare that the same is fully described and represented in the following specification and accompanying drawings, letters, figures, and references thereof.

Of the said drawings, Figure 1 denotes a central and longitudinal section of one of my improved eye-pieces. Fig. 2 is a side view of the slotted tube for holding the lenses and diaphragms of the same. Fig. 3 is a transverse section of the eye-piece.

The usual method of constructing the eye-piece of a telescope has been to make it of a series of tubes fitted or connected together by screws at or near the places or parts where the lenses are situated, such tubes being provided at or near their ends with suitable contrivances for holding the lenses in place. As the tubes were screwed together end for end, in order to gain access to the lenses for the purpose of cleaning them or for any other purpose, it became necessary to separate the tubes from one another and unscrew the confining-screws of the lenses. This mode of applying the lenses, besides being attended with much inconvenience and trouble when it became desirable to remove or cleanse them, subjects the eye-piece to a liability to derangement or injury.

In my improved eye-piece I have not only sought to avoid such difficulties, but to make a simple and substantial eye-piece and one wherein ready access may be easily had to the glasses or lenses in order either to cleanse or repair them, as the case may require. For this purpose I construct the eye-piece of two tubes A B, one of which—viz., B—is made to fit and slide closely into the other. The inner tube I make with one or more wide openings or slots through its side or sides, the same being seen at C. This last tube is intended to support and carry the glasses or lenses and diaphragms of the eye-piece, the said glasses being represented at $a\ b\ c\ d$, while the diaphragms are seen at $e\ f$. Each glass is supported within a ring or frame $g$, whose external diameter is equal to the internal diameter of the tube B, such ring being inserted in place in the tube and fastened by solder or other suitable means. The diaphragms are also similarly secured in place in the tube B. The slot or slots through the side of the tube B should be made large enough to enable a person to pass any suitable cleaning contrivance through it or them and against any one or more of the lenses, so as to admit of cleaning the same. The tube B, thus made and having the glasses and diaphragms placed within it, is to be inserted within the tube A and pushed down against a shoulder or stop $h$, formed around on the interior surface of the latter and so disposed as to allow the tube B to pass into the tube A far enough to permit the eye-hole cap $i$ to be screwed into it.

The tube B may be provided with a small projection $k$ at the eye end of it, which projection may extend from its inner surface and so as to enable a person by putting his finger-nail on it to draw the tube out of the tube A.

Whenever cleaning of the glasses is necessary, it may be readily effected by simply unscrewing the eye-hole cap, drawing the tube B out of the tube A, and wiping the glasses (to which access will be had) with a piece of wash-leather or other suitable material.

The optical arrangement or principle in this eye-piece is essentially the same as it is in other terrestrial eye-pieces.

Eye-pieces are often made so that the distance between the two pairs of lenses can be varied for the purpose of varying the magnifying-power, and sometimes the inverting-glasses are removed for the purpose of obtaining a reduction of power with increased light and field for night use. An eye-piece as above described admitting such changes can readily be made with my improvement applied to it.

What I claim as my invention or improvement consists—

In combining the glasses or glasses and diaphragms with a sliding or eye-piece tube A of a telescope by means of a tube or slide B, perforated through its side or sides in such manner as to enable a person, when the said tube B is withdrawn from its inclosing tube, to obtain ready access through the openings or perforations to the glasses or lenses, the whole being substantially in the manner and for the purpose as described.

In testimony whereof I have hereto set my signature this 26th day of September, A. D. 1851.

ALVAN CLARK.

Witnesses:
  R. H. EDDY,
  FRANCIS GOULD.